No. 777,558. PATENTED DEC. 13, 1904.
T. STIFTER.
ELEVATOR.
APPLICATION FILED JULY 15, 1904.
NO MODEL. 3 SHEETS—SHEET 1.

Witnesses.
Henry N. Bauer
Herbert F. Harden

Inventor.
Theodor Stifter,
by W. P. Herbsleb, His Attorney

No. 777,558. PATENTED DEC. 13, 1904.
T. STIFTER.
ELEVATOR.
APPLICATION FILED JULY 15, 1904.
NO MODEL. 3 SHEETS—SHEET 2.

Witnesses. Inventor.
Henry N. Bauer Theodor Stifter,
Herbert F. Harden by B. F. Hackleb, His Attorney No. 777,558. PATENTED DEC. 13, 1904.
T. STIFTER.
ELEVATOR.
APPLICATION FILED JULY 15, 1904.
NO MODEL. 3 SHEETS—SHEET 3.
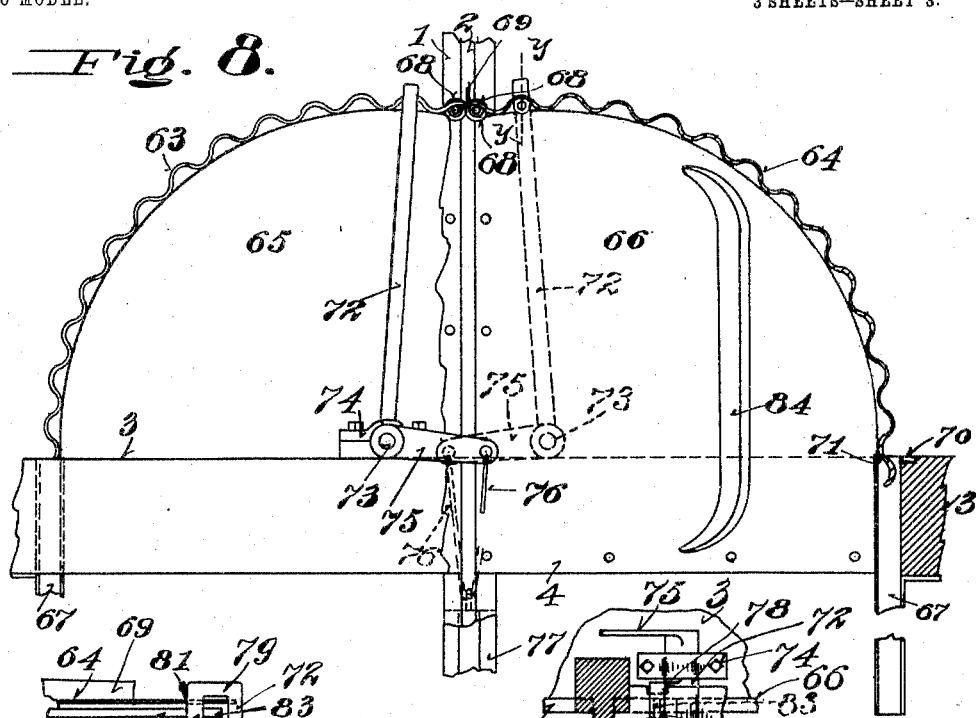
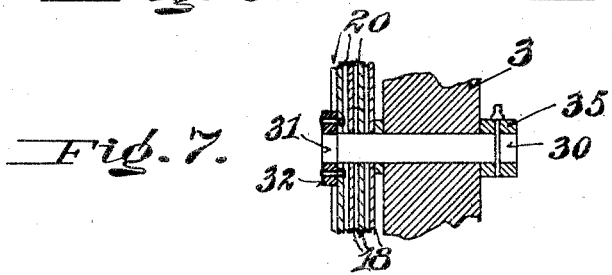
Witnesses. Inventor.
Theodor Stifter No. 777,558. Patented December 13, 1904.

UNITED STATES PATENT OFFICE.

THEODOR STIFTER, OF CINCINNATI, OHIO.

ELEVATOR.

SPECIFICATION forming part of Letters Patent No. 777,558, dated December 13, 1904.

Application filed July 15, 1904. Serial No. 216,634. (No model.)

*To all whom it may concern:*

Be it known that I, THEODOR STIFTER, a citizen of the United States, residing at Cincinnati, in the county of Hamilton and State of Ohio, have invented certain new and useful Improvements in Elevators, of which the following is a specification.

My invention relates to elevators, and has for its object the providing of new and improved closures for the openings or hatchways of elevators and means for their automatic operation; and my invention will be readily understood from the following description and claims and from the drawings, in which—

Figure 1:
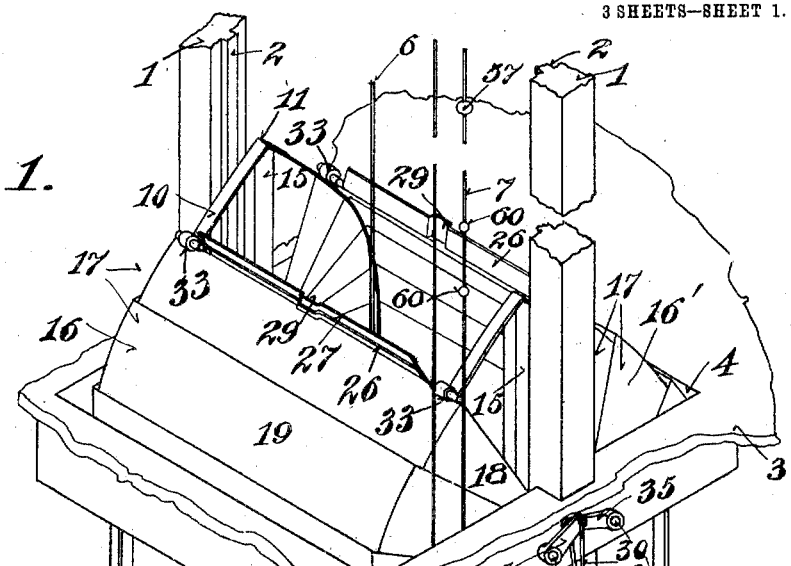
Figure 2:
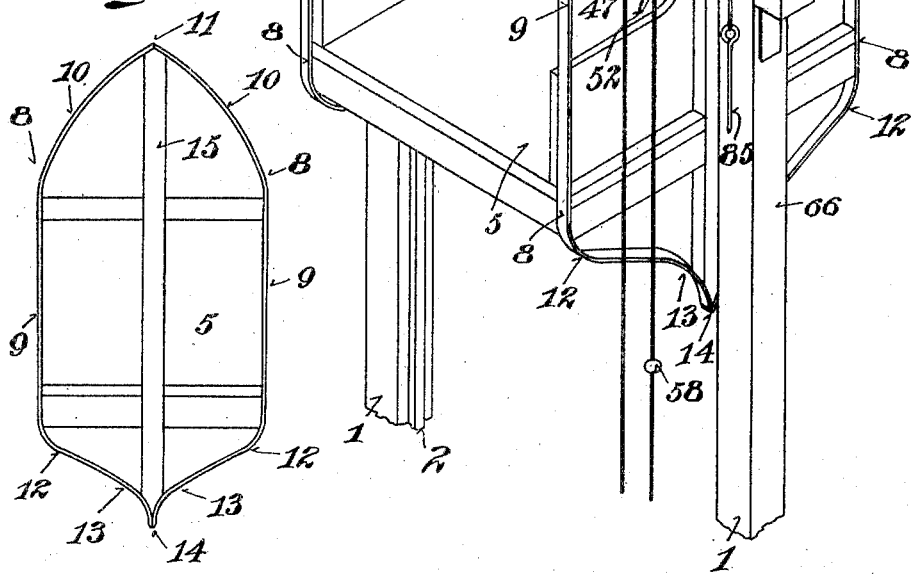
Figure 3:
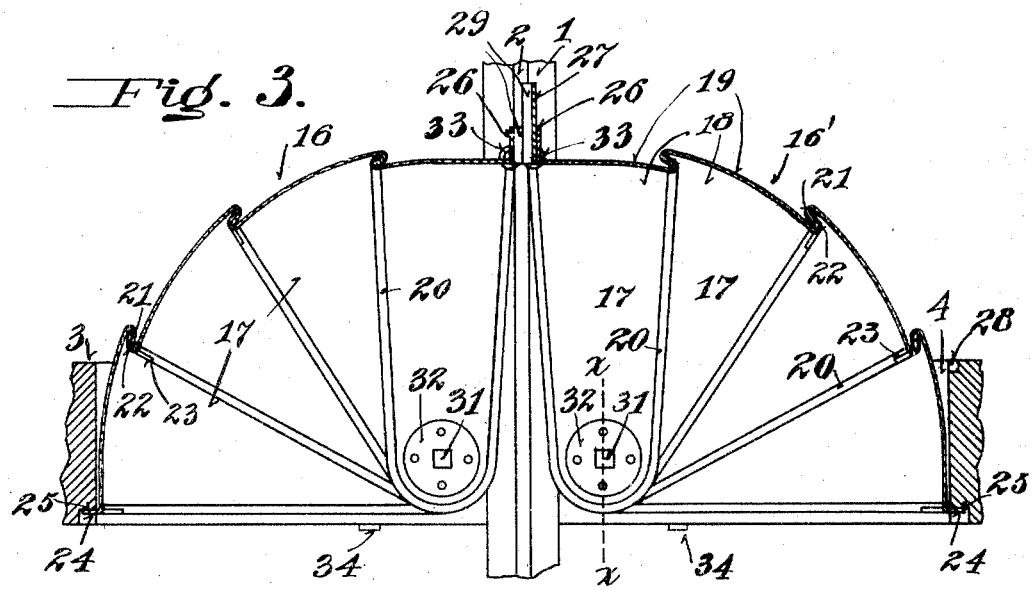
Figure 4:
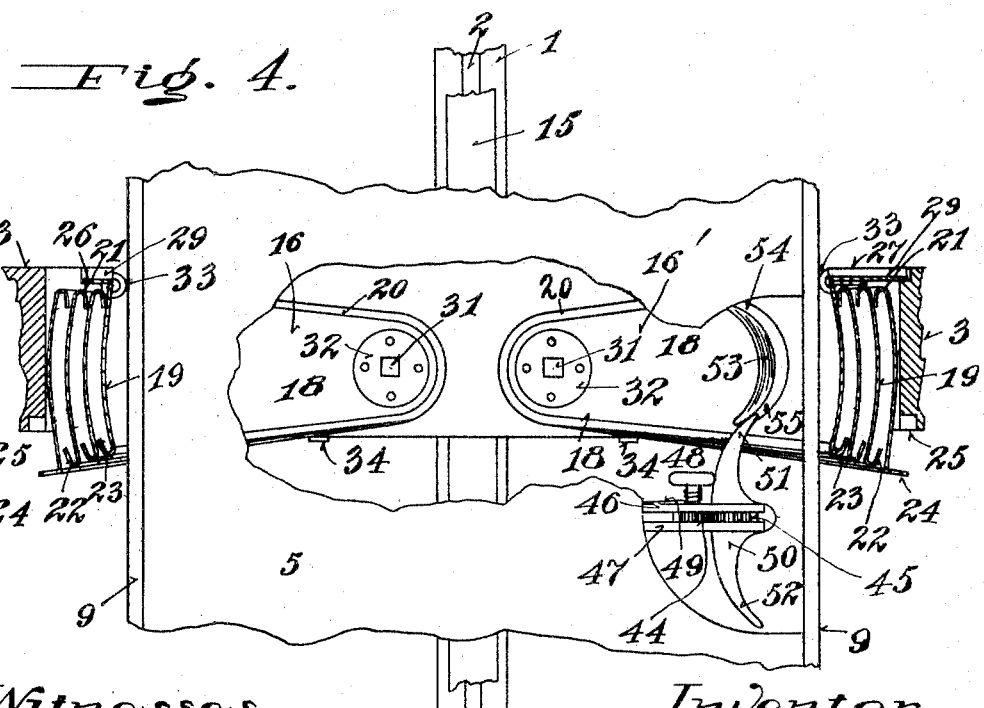

Figure 1 is a perspective view of my improved device. Fig. 2 is a skeleton view of the elevator-car in side elevation, showing the guideways thereon. Fig. 3 is a central vertical section taken from front to rear showing the hood in closed relation. Fig. 4 is a similar view showing the hood in open relation, spread by the elevator-car, the latter partly broken away. Fig. 5 is a plan view, partly broken away, showing the controlling-jaws slightly separated. Fig. 6 is a similar view showing the controlling-jaws in spread relation. Fig. 7 is a detail in longitudinal section on the line *x x* of Fig. 3, showing the manner of pivoting the hood-sections. Fig. 8 is a side elevation, partly broken away, showing sliding hoods for closing the hatchway. Fig. 9 is a detail, partly in section, on the line *y y* of Fig. 8, showing the manner of mounting the sliding hood; and Fig. 10 is a plan detail, partly broken away, showing the manner of mounting the sliding hood.

1 represents the guide-posts for the elevator; 2, the guide-ribs thereon; 3, the floor of the building; 4, the hatchway in the floor; 5, the elevator-car, which may be of platform, cab, or other form; 6, the suspending-cable, and 7 the controlling-cable, for the elevator.

At the hatchways or openings of the elevator I provide my improved closing device, which consists of a receding shield or shields forced out of the way of the elevator-car by means of guideways on the car converging at the top and bottom. The shields preferably consist of pivoted leaves or sections arranged to lap each other and collectively close the opening or hatchway after the elevator has passed through the same, as shown in Fig. 3, or may take the form of sheets receding from the hatchway or opening by reason of contact therewith by the guideways on the car, as shown in Fig. 8.

The platform of the elevator-car is provided with guideways 8, having outer intermediate vertical faces merging above and below into curved faces converging at top and bottom into points adapted to take between and separate the shields upon approach of the car and permit the shields to approach each other and close upon departure of the car therefrom. I prefer the guideways to have outer vertical faces 9, which merge into outer convex faces 10, converging into a point 11 at the top and merging into convex face 12, in turn merging into concave faces 13, converging into a point 14 at the bottom, the concave faces permitting rapid closing of the shields upon ascent of the car. The upper ends of these ways are supported on posts 15, the lower ends being reinforced by the same posts extending past the elevator-car or similar posts secured to the lower ends of the cab or platform.

Preferably at each hatchway or opening there are hoods 16 16', composed of sections 17, telescoping or collapsible one within the other, the sections of one hood telescoping toward the front and the sections of the other hood telescoping toward the rear of the elevator shaft or opening. The sections preferably comprise sides 18, connected by a web 19. The edges of the sides have inturned edges 20 or beads at their inner faces, which take against the outer faces of adjacent sides, thus reducing frictional contact between sides, but providing substantial closure therebetween. Adjacent sections preferably have an inwardly-projecting flange 21 at the upper end thereof and an outwardly-projecting flange 22 at the bottom thereof, the outer edges of the flanges being reflected for forming hooks adapted to take one within the other for forming an overlapping joint between adjacent sections when the hoods are closed. The sections, except the upper one, are also provided with inwardly-projecting lips 23, against which superposed sections are adapted to take and to form rests for the superposed sections when the hoods are collapsed. The lowest section is provided with an outwardly-projecting lip 24, adapted to strike a shoulder 25 in the bottom of the floor for limiting the upward movement of the sections. The inner edges of the inner sections are provided with flanges 26, the front flange having plate 27 secured thereto, adapted to rest in a socket 28 in the floor and act as a spanning-plate between the floor of the elevator-car and the floor of the building when the elevator stops at a floor. The flanges 26 and the plate 27 are provided with indentations 29 for accommodating the suspending-cable. Each of the hoods is preferably pivoted at each side about a shaft 30. The shafts 30 have squared ends 31, taking into squared apertures of plates 32, riveted to the sides of the inner sections. The other sections are pivoted about the shaft. In turning the shafts carry the inner sections with them, and in closing the hoods the other sections are successively moved by reason of their mating hooked connection. The inner sections are also provided with antifriction-rollers 33, against which the guideways of the elevator-car are adapted to take for opening the hoods and permitting them to close. When open, the hoods rest on cleats 34, secured to the bottom of the floor. Levers 35 are secured to the shafts, a rope 36 being secured to the respective ends of the levers. A weight 37 is suspended from the rope for normally closing the hoods.

I have provided improved means whereby the controlling-jaws for the controlling-cable are permitted to pass the hoods. The jaws 38 39 are mounted on arms 40 41, pivoted on shafts 42 43 and connected by segmental gears 44 45. These shafts have their bearings in and the gears are mounted between plates 46 47, secured to the post of the elevator-car. The shaft 42 has a hand-wheel 48 secured thereto for operating the jaws by hand when desired. The hub of the hand-wheel has a spring 49 taking thereabout, one end of the spring being secured to the hand-wheel, the other end being secured to the plate 46, the spring normally closing the jaws.

The jaw 39 has a shoe 50 secured thereto, having outwardly-curved wings 51 52 at its top and bottom, respectively. The inner section of the hood is provided with a guide-plate 53, secured to the inner face of the side of said inner section. This guide-plate has sidewardly-curved faces 54 55 at its top and bottom, respectively, the faces projecting sidewardly toward the wings and forming a rib adapted to take against the wings for turning the jaws upon their pivots. The relative contour of the wings and rib is such as to cause the jaws to open when the car approaches a floor either going up or coming down, to close after passing the floor either going up or coming down, and to be maintained in open relation while the car is passing the floor, thus permitting the jaws to pass through the hood and immediately return to normal or closed position as soon as the hood has been passed. The jaws normally project sidewardly beyond the vertical plane of the hood for taking about the controlling-rope. The jaws collectively have an aperture 56 for receiving the controlling-rope, the jaws being adapted to strike blocks 57 58, respectively, at the top and bottom of the controlling-rope for stopping the elevator at top and bottom of the shaft, the jaws also having an indentation 59 for receiving the rope when it is desired to have a jaw strike intermediate blocks 60 on the controlling-rope for stopping the car at any floor, the aperture 56 being sufficiently large to normally permit passage of the intermediate blocks. One of the jaws has a tooth 61 taking into a socket 62 on the other jaw for steadying the jaws. If it is desired to hold the hoods in open relation, the weights may be raised and a pin 85 inserted into an aperture 86 for maintaining the weights in raised position, which permits the hoods to remain in open position.

If it is desired to use a sheet form of hood or shield for closing the elevator-opening, sheets 63 64 may be provided. These sheets are preferably corrugated. They rest upon and are guided on standards 65 66, stationarily secured to the floor and countersunk into the elevator guide-posts. Below the floor-line they pass into channels 67. Antifriction-rolls 68, similar to the rolls 33, are journaled at the inner ends of the sheets and are adapted to be contacted by the guideways 8. The inner edge of the front sheet is also provided with a tread-plate 69, adapted to rest in a socket 70 in the floor 3 and the upper edge 71 of the inner wall of the channel 67, the tread-plate making contact with the forward edge of the rear sheet when the sheet-hoods are closed. At the inner end of each sheet at each side thereof there is a lever 72. The lever is secured to a shaft 73 in a bearing 74, the shaft having a lever 75 also secured thereto, a rope 76 connecting with the ends of adjacent lever and in turn supporting a weight 77, similar to the weight 37, for normally closing the shields. The lever is preferably outside the standard and takes through an indentation 78 in the shield. It has an inwardly-projecting branch 79, from which a lug 80 projects downwardly through an aperture 81 in the shield, a rod 82 being secured to and connecting the levers at both sides of each shield. The outer end 83 of the rod rides upon the standard. A guide-plate 84 is secured to the inner face of one of the front standards 66 and is constructed similarly to the guide-plate 53, except that the highest point of its rib is extended lengthwise, owing to the greater width of the standard compared to the width of the inner pivoted hood-section, the shoe 50 being turned by and riding upon this guide-plate 84 for permitting the jaws 38 39 to pass the same.

It will be noted that the shields are located adjacent to the floor of the building and extend in hood form above that floor when the shields are closed, thus forming a visible obstruction to the hatchway from the floor, preventing injury to the shields by people stepping upon them or having trucks rolled upon the same, and avoiding consequent accident and dispensing with separate safety-gates.

My improved device is readily applied to new elevators or elevators already in use, whether passenger or freight. It closes the elevator-shaft at each floor against draft, fire, and smoke. The device at each floor closes before the opening of the device at the next floor, and my improved device may be used between floors even in case of fire on other floors. It is easily applied, is simple, durable, and effective.

Having thus fully described my invention, what I claim as new, and desire to secure by Letters Patent, is—

1. In an elevator, the combination, with the car, of a shield movably supported and taking over the hatchway of the elevator and extending upwardly from the floor of the building in hood form when in closed relation, and means between the car and shield for moving the shield out of the path of the car.

2. In an elevator, the combination with a car having a guideway curved above and below, of a pivoted sectional hood taking over the hatchway of the elevator, said hood having a part engaged by said guideway for moving said hood out of the path of the car, substantially as described.

3. In an elevator, the combination with a car having a guideway at front and rear at each side of the car, the guideways at the respective sides of the car having an intermediate straight portion merging into end portions projected toward the median vertical plane of the car, a pair of shields taking over the elevator-hatchway and movable respectively to front and rear by said guideways, said shields located adjacent to and extending in hood form above the floor of the building when said shields are closed, substantially as described.

4. In an elevator, the combination with a car having a guideway at front and rear at each side of the car, the guideways at the respective sides of the car having an intermediate straight portion merging into end portions projected toward the median vertical plane of the car, a pair of pivoted sectional hoods normally taking over the elevator-hatchway, adjacent sections of said hoods having hooked lapping adjacent edges, said guideways arranged to swing said sections outwardly by ascent or descent of the car, and means normally urging said hoods toward each other, substantially as described.

5. In an elevator, the combination with a car having a guideway at front and rear at each side of the car, the guideways at the respective sides of the car having an intermediate straight portion merging into end portions projected toward the median vertical plane of the car, a pair of pivoted sectional hoods normally taking over the elevator-hatchway, adjacent sections of said hoods having hooked lapping adjacent edges, the lower edges of under sections having lips for supporting superposed sections, said guideways arranged to swing said sections outwardly by ascent or descent of the car, and means normally urging said hoods toward each other, substantially as described.

6. In an elevator, the combination with a car having a guideway at front and rear at each side of the car, the guideways at the respective sides of the car having an intermediate straight portion merging into end portions projected toward the median vertical plane of the car, a pair of pivoted sectional hoods normally taking over the elevator-hatchway, adjacent sections of said hoods having hooked lapping adjacent edges, the inner section of the forward hood having a tread-plate at its upper edge, said guideways arranged to swing said sections outwardly by ascent or descent of the car, and means normally urging said hoods toward each other, substantially as described.

7. In an elevator, the combination with a car having a guideway at each corner having end portions projected toward the median vertical plane of the car, a pair of movable shields normally taking over the hatchway of the elevator, said shields located adjacent to and extending in hood form above the floor of the building when said shields are closed, said shields arranged to be engaged by said guideways on passage of said car through the hatchway and thereby move said shields out of the path of the car, and means normally urging said shields toward each other for closing said hatchway, substantially as described.

8. In an elevator, the combination with a car having a guideway above and below, of a shield movably supported and taking over the hatchway of the elevator, said shield having a part engaged by said guideway for moving said shield out of the path of the car, a controlling-rope, split jaws therefor pivoted on the car, a shoe for said jaws and a guide-plate for said shoe, said shoe and guide-plate having oppositely-curved engaging faces automatically spreading said jaws by movement of said shoe upon said plate, substantially as described.

9. In an elevator, the combination with a car having a guideway above and below, of a shield movably supported and taking over the hatchway of the elevator, said shield having a part engaged by said guideway for moving said shield out of the path of the car, a controlling-rope, split jaws therefor pivoted on the car, a shoe for said jaws and a guide-plate having oppositely-curved engaging faces automatically spreading said jaws by movement of said shoe upon said plate, said jaws having an indentation for receiving the controlling-rope, blocks on the controlling-rope engaged by said jaws, and means normally closing said jaws, substantially as described.

10. In an elevator, the combination with a car having a guideway above and below, of a pivoted sectional hood, taking over the hatchway of the elevator, the sections of said hood comprising sides and a connecting-web, the inner section of said hood having a part engaged by said guideway for collapsing said sections one within the other out of the path of the car, means normally spreading said sections, a controlling-rope, split jaws therefor pivoted on the car, a shoe for said jaws, a guide-plate for said shoe on the inner face of the side of said inner section, said shoe and guide-plate having oppositely-curved engaging faces, the curved face of said shoe engaging the curved face of said guide-plate for automatically spreading said jaws when said hood is in collapsed relation by the car passing therethrough, substantially as described.

11. In an elevator, the combination, with a car having a guideway, of a shield movably supported and taking over the hatchway of the elevator and extending upwardly from the floor of the building in hood form when in closed relation, said shield having a part engaged by said guideway for moving said shield out of the path of the car, substantially as described.

In testimony whereof I have signed my name hereto in the presence of two subscribing witnesses.

THEODOR STIFTER.

Witnesses:
AUGUST KILLIAN,
HERBERT F. HARDEN.